(12) United States Patent
Obu et al.

(10) Patent No.: US 8,472,122 B2
(45) Date of Patent: Jun. 25, 2013

(54) OPTICAL SYSTEM

(75) Inventors: Kenji Obu, Sagamihara (JP); Ken Wada, Sakura (JP)

(73) Assignee: Canon Kabushiki Kaisha (JP)

( * ) Notice: Subject to any disclaimer, the term of this patent is extended or adjusted under 35 U.S.C. 154(b) by 29 days.

(21) Appl. No.: 13/290,457

(22) Filed: Nov. 7, 2011

(65) Prior Publication Data

US 2012/0127582 A1  May 24, 2012

(30) Foreign Application Priority Data

Nov. 22, 2010  (JP) ................................ 2010-259887

(51) Int. Cl.
  *G02B 15/14* (2006.01)
  *G02B 3/12* (2006.01)

(52) U.S. Cl.
  USPC ............................ 359/683; 359/666; 359/676

(58) Field of Classification Search
  USPC .................. 359/666, 676, 683, 685
  See application file for complete search history.

(56) References Cited

U.S. PATENT DOCUMENTS

| | | | | |
|---|---|---|---|---|
| 4,871,240 A * | 10/1989 | Suda | ............................. | 359/688 |
| 5,315,435 A * | 5/1994 | Horiuchi | ....................... | 359/554 |
| 6,459,535 B1 * | 10/2002 | Goto | ............................. | 359/666 |
| 7,265,911 B2 * | 9/2007 | Goosey et al. | ................. | 359/676 |
| 7,317,580 B2 * | 1/2008 | Kogo et al. | ..................... | 359/666 |
| 7,352,514 B2 | 4/2008 | Hendriks et al. | | |
| 8,169,709 B2 * | 5/2012 | Jannard et al. | ................ | 359/668 |
| 8,369,020 B2 * | 2/2013 | Wada et al. | .................... | 359/666 |

FOREIGN PATENT DOCUMENTS

| | | | |
|---|---|---|---|
| JP | 2005084387 A | 3/2005 | |
| JP | 2005292763 A | 10/2005 | |
| JP | 2007518133 A | 7/2007 | |

* cited by examiner

*Primary Examiner* — David N Spector
(74) *Attorney, Agent, or Firm* — Rossi, Kimms & McDowell LLP

(57) ABSTRACT

The optical system of the present invention includes a plurality of lens groups and a variable focus lens. Here, the variable focus lens satisfies the following condition:

$$-0.023 \leq \{(n_A-1)/\nu_A-(n_B-1)/\nu_B\}/(n_B-n_A) \leq 0.023$$

where $n_A$ and $n_B$ respectively denote the d-line refractive indices of a first medium and a second medium, and $\nu_A$ and $\nu_B$ respectively denote the d-line Abbe numbers of the first and second media. In addition, the plurality of lens groups moves in an optical axial direction; and the following condition holds:

$$0.8 < |f_{ao}|/f_w < 5$$

where $f_{ao}$ denotes the composite focal distance at the wide angle end of the part of the optical system, and $f_w$ denotes the focal distance of the entire system at the wide angle end.

2 Claims, 10 Drawing Sheets

OPTICAL SYSTEM

BACKGROUND OF THE INVENTION

1. Field of the Invention

The present invention relates an optical system that includes a variable focus lens.

2. Description of the Related Art

Conventionally, a variable focus lens that can change refractive power by controlling the shape of an interface between liquid media is known. In addition, increasing magnifications and furthermore downsizing of optical systems while reducing the amount of movement of lens groups is realized by using this variable focus lens in an optical system such as a zoom lens. The zoom lenses and image pickup apparatuses disclosed in Japanese Patent Laid Open No. 2005-84387 and Japanese Patent Laid Open No. 2005-292763 realize downsizing and, in addition, advantageously correct aberration by using such a variable focus lens.

However, in the zoom lenses and the image pickup apparatuses that have been disclosed in Japanese Patent Laid Open No. 2005-84387 and Japanese Patent Laid Open No. 2005-292763, when the refractive power of the variable focus lens varies because insufficient consideration has been given to achromatism, in particular, the fluctuation in chromatic aberration becomes large.

SUMMARY OF THE INVENTION

Thus, the present invention provides an optical system that can reduce the fluctuation of chromatic aberration when the shape of the interface between variable focus lenses changes.

According to an aspect of the present invention, an optical system is provided that includes a plurality of lens groups and a variable focus lens that can change the refractive power by changing the shape of the interface that is formed by a first medium and a second medium that have differing refractive indices, wherein the following condition is satisfied:

$$-0.023 \leq \{(n_A-1)/\nu_A-(n_B-1)/\nu_B\}/(n_B-n_A) \leq 0.023$$

where $n_A$ and $n_B$ respectively denote the d-line refractive indices of the first and second media, and $\nu_A$ and $\nu_B$ respectively denote the d-line Abbe numbers of the first and second media.

The plurality of lens groups moves in an optical axial direction when changing the magnification from the wide angle end to the telephoto end, and the following condition holds:

$$0.8 < |f_{ao}|/f_w < 5$$

where $f_{ao}$ denotes the composite focal distance at the wide angle end of the part of the optical system from the optical plane of the optical system closest to the object side to the optical plane of the variable focus lens closest to the image side, and $f_w$ denotes the focal distance of the entire system at the wide angle end.

According to the present invention, an optical system can be provided that can reduce fluctuation in chromatic aberration when changing the shape of the interface between variable focus lenses.

Further features of the present invention will become apparent from the following description of exemplary embodiments with reference to the attached drawings.

DESCRIPTION OF THE EMBODIMENTS

First Embodiment

Figure 1A:
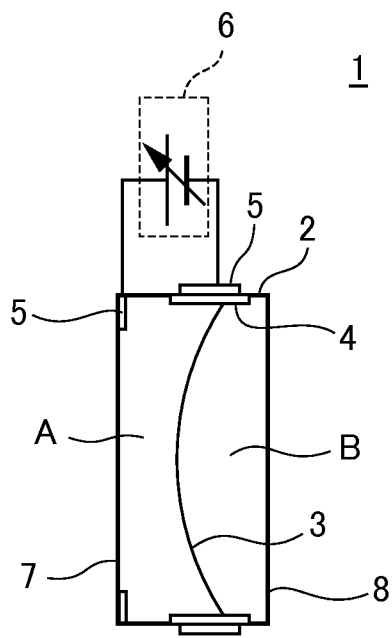
FIG. 1A is a schematic drawing that shows the configuration of the variable focus lens according to a first embodiment of the present invention.
Figure 2:
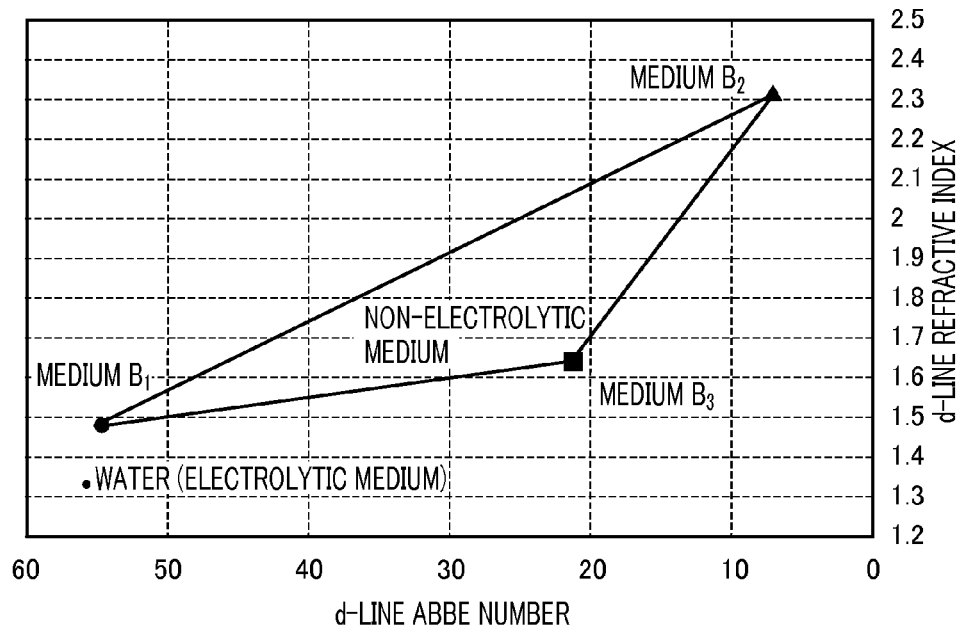
FIG. 2 is a graph that shows that characteristics of the media used in the variable focus lens.

First, a variable focus lens according to a first embodiment of the present invention will be explained. FIG. 1A is a schematic drawing that shows the structure of the variable focus lens (below, simply referred to as the "liquid lens" of the present embodiment). Below, the refractive power (optical power) is used as a characteristic value of a lens that corresponds to the inverse of the focal distance. The liquid lens 1 can change the refractive power by changing the shape of the interface that is formed by two media (liquids) having differing refractive indices by using an electric drive (electrowetting drive). This liquid lens 1 includes a substantially tubular case 2, and, in order from the light incident side, the two types of media, a first medium A and a second medium B, are disposed in two layers in an optical axial direction inside the case 2. As the first medium A and the second medium B, materials are used that are mutually immiscible at the interface 3 that is formed by both media A and B. For example, an electrolytic solution consisting mainly of water ($n_d$=1.33, $\nu_d$=55.7 (refer to FIG. 2, explained below)) may be used as a first medium A and an oil-based non-electrolytic solution may be used as a second medium B. The oil-based medium is assumed to be, for example, one that falls within the characteristic area as shown in FIG. 2. In the graph shown in FIG. 2, the d-line Abbe number $v_d$ is shown on the abscissa and the d-line refractive index $n_d$ is on the ordinate. Here, each known oil-based media $B_1$ ($n_d$=1.48, $v_d$=54.6), $B_2$ ($n_d$=2.32, $v_d$=7), and $B_3$ ($n_d$=1.64, $v_d$=21.2) are mixed in freely selected volume ratios to obtain thereby freely selected characteristics within the area (the triangle in the figure). Thus, in the present embodiment, using the media range within the characteristic area shown in FIG. 2 as a target, an oil-based medium having $n_d$=1.48 and $v_d$=54.6 is used as the second medium B.

In addition, liquid lens 1 is provided in an annular shape at the inner peripheral portion of the case 2 with the first medium A and the second medium B and the insulating films 4 that are in contact with, and electrodes 5 that are positioned at an outer peripheral portion of the insulating film 4. The lens 1 is further provided with a power source 6 that applies a voltage between the electrodes 5 and the first medium A, which consists of an electrolytic liquid. In this case, the electrode 5 changes the shape (the half-radius of curvature) of the interface 3 by controlling the contact angle with the interface 3 by the application of voltage from the power source 5. Furthermore, the liquid lens 1 includes, at both ends of the light incident side and the light emitting side, a first protective plate 7 and a second protective plate 8 that respectively seal the first medium A and the second medium B inside. Each of the protective plates 7 and 8 are formed by a transparent material such as silica glass.

In this liquid lens 1, when considering application to an image pickup device such as a camera and the like, using an electronic drive method such as the one described above is desirable in terms of transmission rate and responsiveness. However, as shown, for example, in FIG. 1B, the same function can be provided by using an transmission elastic film 9 at the interface 3 and mechanically controlling a film support portion 11 that connects to the elastic film 9 by a drive unit 10, such as an actuator. In this case, even if the liquid lens contains liquids that are two media miscible, there are the merits on the points that the shape of the interface can be changed and the selectivity of the media is high.

Figure 3:
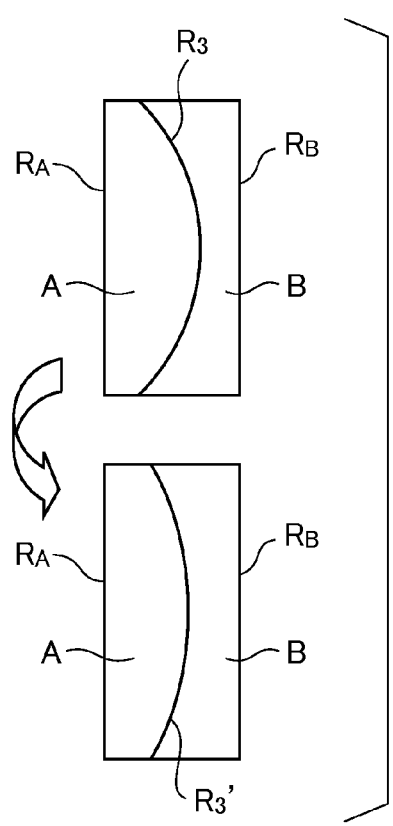
FIG. 3 is a drawing for explaining the principle of a variable focus lens.

In the present embodiment, when the shape of the interface 3 of this liquid lens 1 is changed, the fluctuation in chromatic aberration while the liquid lens 1 is being driven is reduced by setting the relationship between the refractive index and the Abbe number of the first medium A and the second medium B as follows. Below, the operation of the liquid lens 1 of the present embodiment will be explained. FIG. 3 is a diagram for explaining the principle of the liquid lens 1 of the present embodiment, and the appearance of the liquid lens 1 during the change from before being driven to after being driven is shown. First, as shown in the upper part of FIG. 3, in the liquid lens 1, the refractive index of the first medium A is denoted by $n_A$, the refractive index of the second medium B is denoted by $n_B$, the radius of curvature of the object plane side and the image plane side are respectively denoted by $R_A$ and $R_B$, and finally, the radius of curvature of the interface 3 is denoted by $R_3$. In this context, the refractive power of the entire liquid lens 1 system is $\Phi P_1$. Here, the chromatic aberration is generated in proportion to the amount defined by $E=\Phi/v$ with respect to the refractive power $\Phi$ and the Abbe number $v$ of the first and second media A and B.

In this case, where the refractive power of the lens portion that is formed by the first medium A is set to $\Phi P_{A1}$, the refractive power of the lens portion that is formed by the second medium B is set to $\Phi P_{B1}$, and the Abbe number of the first and second media A and B are respectively set to $v_A$ and $v_B$, the chromatic aberration $E_1$ generated by the liquid lens 1 is represented by Formula (1).

$$E_1 = \Phi P_{A1}/v_A + \Phi P_{B1}/v_B \tag{1}$$

where $$\Phi P_{A1} = (n_A-1)/(1/R_A - 1/R_3),$$

$$\Phi P_{B1} = (n_B-1)/(1/R_3 - 1/R_B), \text{ and}$$

$$\Phi P_1 = \Phi P_{A1} + \Phi P_{B1}.$$

Next, in the liquid lens 1, as shown in the lower portion of FIG. 3, consider the case in which the radius of curvature of the interface 3 is changed to $R_3'$ and the refractive power of the overall liquid lens 1 system is changed to $\Phi P_2$. In this case, where the refractive power of the lens portion that is formed by the first medium A is set to $\Phi P_{A2}$ and the refractive power of the lens portion that is formed by the second medium B is set to $\Phi P_{B2}$, the chromatic aberration $E_2$ generated by the liquid lens 1 is represented by Formula (2).

$$E_2 = \Phi P_{A2}/v_A + \Phi P_{B2}/v_B \tag{2}$$

where $$\Phi P_{A2} = (n_A-1)/(1/R_A - 1/R_3'),$$

$$\Phi P_{B2} = (n_B-1)/(1/R_3' - 1/R_B), \text{ and}$$

$$\Phi P_2 = \Phi P_{A2} + \Phi P_{B2}$$

Here, when the radius of curvature of the interface 3 changes, the change $\Delta E$ of the chromatic aberration is modified as represented by Formula (3).

$$\begin{aligned}
\Delta E &= E_2 - E_1 \\
&= (n_A - 1)/v_A \times (1/R_3 - 1/R_{3'}) + \\
&\quad (n_B - 1)/v_B \times (1/R_{3'} - 1/R_3) \\
&= \{(n_A - 1)/v_A - (n_B - 1)/v_B\}(1/R_3 - 1/R_{3'})
\end{aligned} \tag{3}$$

In contrast, when the radius of curvature of the interface 3 changes, the change $\Delta \Phi$ of the refractive index is modified as represented by Formula (4).

$$\begin{aligned}
\Delta \Phi &= \Phi P_2 - \Phi P_1 \\
&= (n_B - n_A) \times (1/R_3 - 1/R_{3'})
\end{aligned} \tag{4}$$

Therefore, the relationship between the change in the refractive power and the change in the chromatic aberration in the liquid lens 1 is shown, based on Formula (3) and Formula (4), by Formula (5).

$$\Delta E = \{(n_A-1)/v_A - (n_B-1)/v_B\} \times \Delta \Phi / (n_B - n_A) \tag{5}$$

This means that if media are selected such that the amount defined by $\{(n_A-1)/v_A - (n_B-1)/v_B\}/(n_B-n_A)$ in accordance to Formula (5) approaches zero, the liquid lens 1 can suppress chromatic aberration that is generated irrespective of the change in the refractive power.

Figure 4:
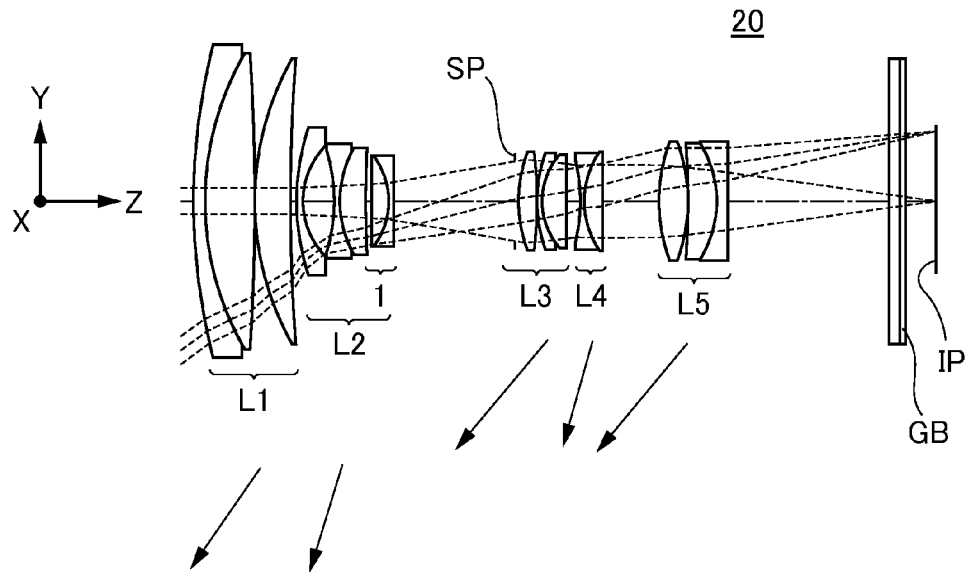
FIG. 4 is a cross-sectional view of the optical system according to the first embodiment of the present invention.

Next, an optical system that uses the liquid lens 1 according to the present embodiment will be explained. FIG. 4 is a cross-sectional view of the optical system according to the present embodiment. First, this optical system 20 is provided with, in order from the light incident side (object side), a first lens group L1 having a positive refractive power, a second lens group L2 having a negative refractive power, a third lens group L3 having a positive refractive power, a fourth lens group L4 having a negative refractive power, and a fifth lens group L5 having a positive refractive power. The arrows shown at the lower portion of each of these lens groups indicate the drive direction of each of the respective lens groups, and are identical in each of the figures of the optical systems below. In addition, the lens system 20 is provided with an aperture stop SP that is disposed directly in front of the third lens group L3, an image plane IP that is formed by the image pickup elements of a CCD or the like, and glass block GB, such as a CCD protecting glass or a low pass filter, that is disposed directly in front of the image plane IP. Furthermore, the optical system 20 includes the liquid lens 1 in the second lens group L2. During image pickup or when the distance to the object changes, the liquid lens 1 adjusts the focal point by changing the shape of the interior interface 3. This optical system 20 attains a high magnification because the first to fifth lens groups L1 to L5 all move in an axial direction when changing the magnification from the wide angle end to the telephoto end. Here, "wide angle end" and "telephoto end" indicate the positions where each of the magnification-changing lens groups is positioned at the ends of the range within which they can be moved optically or mechanically.

In addition, in the present embodiment, the liquid lens 1 satisfies the following conditions. First, when each of the d-line refractive indices of the first and second media A and B is denoted $n_A$ and $n_B$, and each of the d-line Abbe numbers of the first and second media A and B are denoted by $v_A$ and $v_B$, the following Formula (6) holds:

$$-0.023 \leq \{(n_A-1)/v_A-(n_B-1)/v_B\}/(n_B-n_A) \leq 0.023 \quad (6)$$

Furthermore, more preferably Formula (6a) holds:

$$-0.022 \leq \{(n_A-1)/v_A-(n_B-1)/v_B\}/(n_B-n_A) \leq 0.022 \quad (6a)$$

Here, as was explained using the above Formula (5), the liquid lens 1 can suppress the generated chromatic aberration by making $\{(n_A-1)/v_A-(n_B-1)/v_B\}/(n_B-n_A)$ approach zero. More specifically, in the present embodiment the liquid lens 1 can especially suppress chromatic aberration by satisfying the conditions that are represented in Formulae (6) and (6a). Formula (6) and Formula (6a) determine the relationship between the refractive index and the Abbe number of the media that are used in the liquid lens 1, and even if either of the upper or lower limits is exceeded, it is not preferable that the fluctuation of the chromatic aberration during a change in the refractive power becomes large.

In addition, among the first and second media A and B that are used in the liquid lens 1, when the d-line refractive index and Abbe number of the media having a high refractive index are respectively denoted by $n_d$ and $v_d$, the following Formulae (7) to (9) hold:

$$n_d < -0.0211 vd + 2.641 \quad (7)$$

$$28 < v_d < 55 \quad (8)$$

$$1.48 < n_d \quad (9)$$

Figure 5:
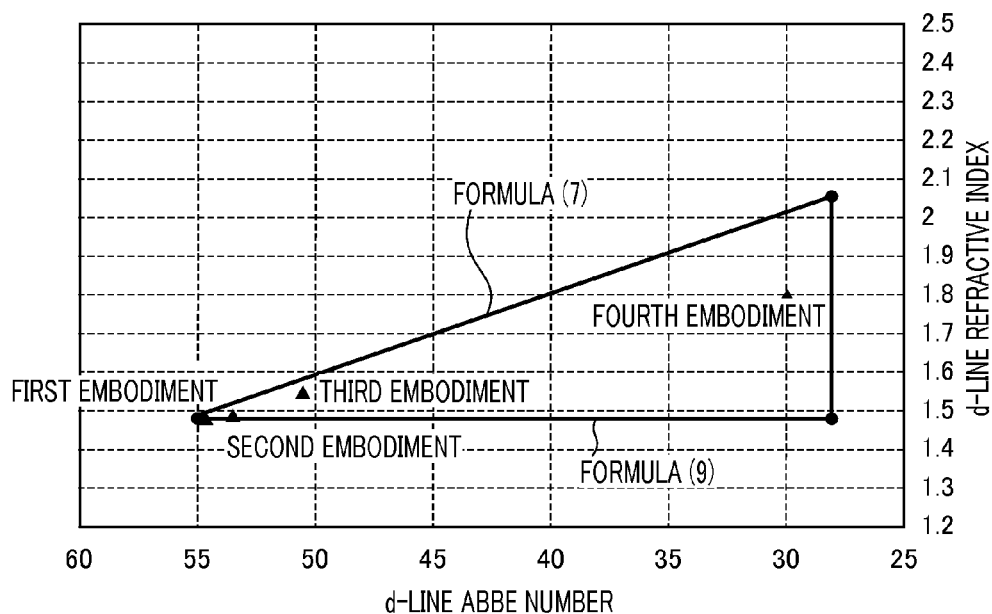
FIG. 5 is a graph that shows the characteristic ranges of media that can be used in a variable focus lens.

These Formulas (7) to (9) determine the characteristic range, shown in FIG. 5, of the media that can be used in the liquid lens 1. In the graph that is shown in FIG. 5 as well, the d-line Abbe number $v_d$ is shown on the abscissa axis and the d-line refractive index $n_d$ is shown on the ordinate axis. As is also clear from FIG. 5, with respect to the refractive index $n_d$, no medium having a high refractive index that exceeds the range of Formula 7 exists. In addition, when the range of Formula (9) is exceeded and the refractive index $n_d$ of the medium becomes small, the changing of a desired refractive power or the effect of high magnification cannot be obtained, and this is not preferable. Furthermore, in Formula (7), although the range of the Abbe number $v_d$ of the medium is determined, when the upper limiting value is exceeded, the refractive index $n_d$ becomes low, while in contrast, when the lower limiting value is exceeded, the fluctuation in chromatic aberration generated by the liquid lens 1 during a fluctuation in the refractive power becomes large, and thus, this is not preferable.

Furthermore, in the present embodiment, when the composite focal distance at the wide angle end of the portion of the optical system from the optical plane of the optical system 20 most on the object side to the optical plane of the liquid lens 1 most on the image side is denoted by $f_{ao}$ and the focal distance of the entire system at the wide angle end is denoted by $f_w$, the conditions represented by the following Formula (10) are satisfied.

$$0.8 < |f_{ao}|/f_w < 5 \quad (10)$$

In addition, more preferably, Formula (10a) holds:

$$0.8 < |f_{ao}|/f_w < 3.5 \quad (10a)$$

Even more preferably, Formula (10b) holds:

$$0.8 < |f_{ao}|/f_w < 2 \quad (10b)$$

In these Formulas (10) to (10b), when the value of $|f_{ao}|/f_w$ exceeds a lower limiting value, the refractive power of the lens group on the object side becomes too strong due to the liquid lens 1, and this is not preferable. In contrast, when the value of $|f_{ao}|/f_w$ exceeds an upper limiting value, the lateral magnification of the lens group on the image side becomes small due to the liquid lens 1, and the fluctuation in the chromatic aberration during a change in the refraction power becomes large. Thus, the optical system 20 can suppress chromatic aberration that occurs during changes in the refractive power by satisfying the conditions of Formulas (10) to (10b).

Next, each of the conditions described above will be applied to the liquid lens 1 and the optical system 20, and the effects of the present embodiment will be shown by substituting specific numerical values. TABLE 1 is a table that shows each of the numerical values for each of the plane numbers 1 to 31 that are appended to the planes of each structural component of the optical system 20 that is shown in FIG. 4. Here, in FIG. 4, the position of the light source (object) is used as a reference for an absolute coordinate system to obtain three-dimensional coordinate axes (X axis, Y axis, and Z axis). The Z axis passes from the center of the zeroth plane through the center of a first plane (origin of the absolute coordinates), and this direction is defined as positive. In addition, the Y axis passes through the center of the first plane, and is an axis that is set 90 degrees in a counterclockwise direction with respect to the Z axis. The X axis passes through the origin, and is an axis that is orthogonal to the Z axis and the Y axis. In TABLE 1, the respective numerical values for the radius of curvature (R), the depth between lens planes (d), the d-line refractive index ($n_d$) and the Abbe number ($v_d$), and the effective diameter of the lenses are shown for each plane number (No.). Note that unless otherwise specified, each of these numerical values of TABLE 1 show numerical values during focus to infinity. Furthermore, the aspheric shape of the optical elements that have a rotationally asymmetric aspheric plane in the optical system 20 are shown in Formula (11), where the shift in the optical axis direction at a position having a height h from the optical axis is set to x, where the plane vertex serves as a reference.

$$x=(h^2/R)/[1+\{1-(1+k)(h/R)^2\}^{1/2}]+Ah^4+Bh^6+Ch^8+Dh^{10}+Eh^{12} \quad (11)$$

Figure 6A:
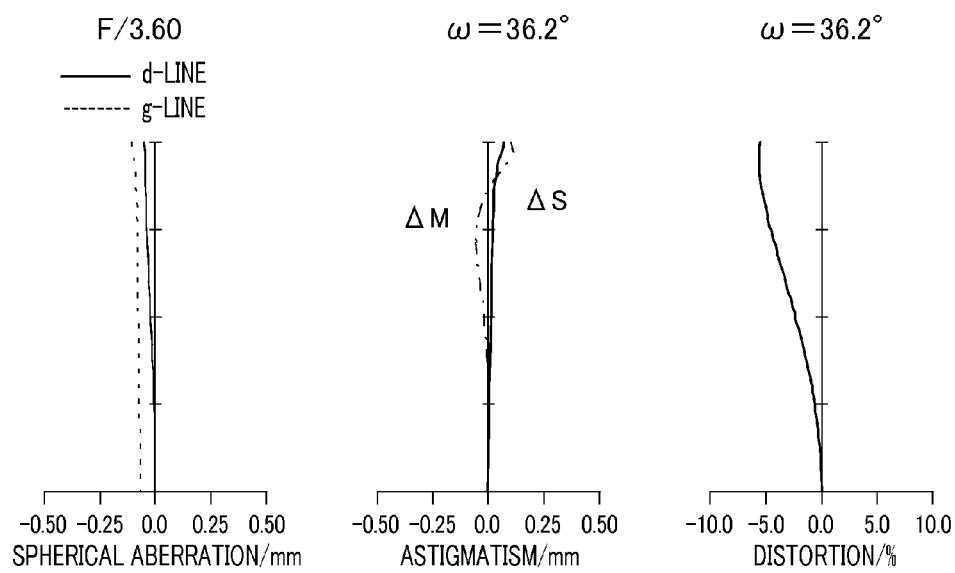
FIG. 6A shows the longitudinal aberration diagrams at the wide angle end of the optical system according to the first embodiment.
Figure 6B:
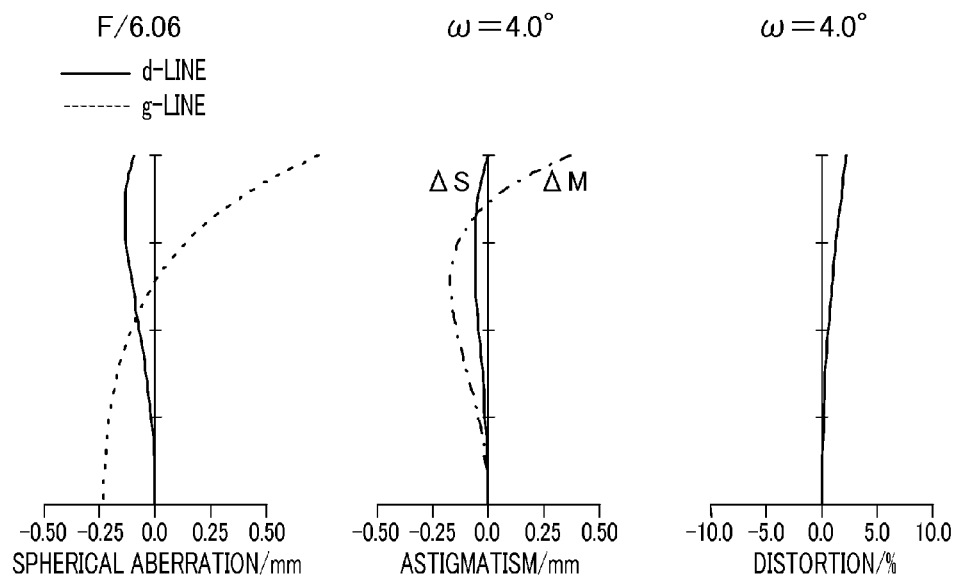
FIG. 6B shows the longitudinal aberration diagrams at the telephoto end of the optical system according to the first embodiment.

Here, k is the conic coefficient, and the values of each of the non-spherical surface coefficients k and A to D applied to Formula (11) are shown in TABLE 2. In addition, TABLE 3 shows each type of data at each zoom position of the optical system 20. In this case, the zoom ratio is 10.39. In addition, TABLE 4 shows each type of data for the first through fifth lens groups L1 to L5 and the glass block GB. Furthermore, TABLE 5 shows each type of data for single lenses. Note that for reference, FIG. 6A and FIG. 6B show a longitudinal aberration diagrams (spherical aberration, astigmatism, and distortion) according to the present embodiment. In particular, FIG. 6A is a longitudinal aberration diagrams at the wide angle end, and FIG. 6B is a longitudinal aberration diagrams at the telephoto end. In FIG. 6A and FIG. 6B, the longitudinal axis is the optical axis height at which light rays are incident to the optical system 20, and the latitudinal axis is the position at which the light rays cross the optical axis. Each of the figures discloses each optical axis having the wavelength of the d-line and the g-line.

TABLE 1

| No. | R (mm) | d (mm) | $n_d$ | $v_d$ | Effective radius (mm) |
|---|---|---|---|---|---|
| 1 | 126.045 | 2.00 | 1.80610 | 33.3 | 57.07 |
| 2 | 55.324 | 9.26 | 1.49700 | 81.5 | 53.26 |
| 3 | −441.653 | 0.15 | | | 52.67 |
| 4 | 55.348 | 6.49 | 1.65160 | 58.5 | 50.95 |
| 5 | 303.098 | (variable) | | | 50.28 |
| 6 | 45.294 | 1.20 | 1.83481 | 42.7 | 25.26 |
| 7 | 14.388 | 5.81 | | | 19.88 |
| 8 | −33.411 | 0.90 | 1.77250 | 49.6 | 19.35 |
| 9 | 18.866 | 0.15 | | | 17.88 |
| 10 | 20.267 | 4.88 | 1.92286 | 18.9 | 17.87 |
| 11 | 174.772 | 1.13 | | | 16.87 |
| 12 | ∞ | 3.15 | 1.33304 | 55.7 | 16.34 |
| 13 | −14.092 | 0.88 | 1.48000 | 54.6 | 15.91 |
| | (Focus variable) | | | | |
| 14 | ∞ | (variable) | | | 15.30 |
| 15 (stop) | ∞ | 0.52 | | | 14.73 |
| 16 | 21.945 | 3.48 | 1.58313 | 59.4 | 16.49 |
| 17* | −146.279 | 0.15 | | | 16.47 |
| 18 | 26.379 | 0.90 | 1.80518 | 25.4 | 16.35 |
| 19 | 12.706 | 4.67 | 1.48749 | 70.2 | 15.60 |
| 20 | −939.851 | (variable) | | | 15.45 |
| 21 | −31.014 | 0.70 | 1.71300 | 53.9 | 15.38 |
| 22 | 15.904 | 3.35 | 1.80610 | 33.3 | 16.37 |
| 23 | −1147.642 | (variable) | | | 16.56 |
| 24 | 29.290 | 5.35 | 1.49700 | 81.5 | 19.72 |
| 25 | −32.595 | 0.10 | | | 19.86 |
| 26* | −473.874 | 5.46 | 1.58313 | 59.4 | 19.59 |
| 27 | −20.086 | 2.00 | 1.83481 | 42.7 | 19.48 |
| 28 | −564.118 | (variable) | | | 20.02 |
| 29 | ∞ | 2.06 | 1.54400 | 60.0 | 50.00 |
| 30 | ∞ | 1.10 | 1.55900 | 58.6 | 50.00 |
| 31 | ∞ | | | | 50.00 |
| Image plane | ∞ | | | | |

TABLE 2

| | k | A | B | C | D | E |
|---|---|---|---|---|---|---|
| 17$^{th}$ plane | 0.0 | 1.67405e−006 | 6.93368e−009 | None | None | None |
| 26$^{th}$ plane | 0.0 | −2.48884e−005 | −2.50285e−008 | −1.21774e−010 | 6.69764e−013 | None |

TABLE 3

| | Wide angle (mm) | Intermediate (mm) | Telephoto (mm) |
|---|---|---|---|
| Focal distance | 18.60 | 50.00 | 193.26 |
| F number | 3.60 | 4.87 | 6.06 |
| Image angle | 36.18 | 15.22 | 4.03 |
| Image height | 13.60 | 13.60 | 13.60 |
| Lens total length | 138.7 | 171.8 | 207.0 |
| BF | 5.65 | 5.65 | 5.65 |
| d (5$^{th}$ plane) | 1.20 | 23.76 | 50.49 |
| d (14$^{th}$ plane) | 22.70 | 11.49 | 2.85 |
| d (20$^{th}$ plane) | 2.60 | 6.22 | 19.09 |
| d (23$^{rd}$ plane) | 10.58 | 6.95 | 1.87 |
| d (28$^{th}$ plane) | 30.09 | 51.87 | 61.20 |
| Incident pupil position | 31.09 | 83.82 | 287.09 |
| Emitting pupil position | −74.55 | −93.53 | −110.12 |
| Front side main point position | 45.37 | 108.62 | 157.75 |
| Back side main point position | −12.95 | −44.34 | −187.60 |

TABLE 4

| Lens group | First plane | Focal distance (mm) | Lens configuration length (mm) | Front main point position (mm) | Back main point position (mm) |
|---|---|---|---|---|---|
| L1 | 1 | 86.39 | 17.90 | 5.74 | −5.70 |
| L2 | 6 | −11.74 | 18.10 | 4.19 | −8.30 |
| L3 | 15 | 27.29 | 9.73 | 0.88 | −5.63 |
| L4 | 21 | −61.17 | 4.05 | −0.24 | −2.51 |
| L5 | 24 | 47.82 | 12.91 | −1.20 | −9.05 |
| GB | 29 | ∞ | 3.16 | 1.02 | −1.02 |

TABLE 5

| Lens | First plane | Focal distance (mm) |
|---|---|---|
| 1 | 1 | −123.89 |
| 2 | 2 | 99.54 |
| 3 | 4 | 102.86 |
| 4 | 6 | −25.71 |
| 5 | 8 | −15.49 |
| 6 | 10 | 24.47 |
| 7 | 12 | 42.31 |
| 8 | 13 | −29.36 |
| 9 | 16 | 32.98 |
| 10 | 18 | −31.37 |
| 11 | 19 | 25.76 |
| 12 | 21 | −14.65 |
| 13 | 22 | 19.49 |
| 14 | 24 | 31.96 |
| 15 | 26 | 35.81 |
| 16 | 27 | −24.99 |
| 17 | 29 | 0.00 |
| 18 | 30 | 0.00 |

As shown above, according to the liquid lens 1 of the present embodiment and the optical system 20 that uses this liquid lens 1, the fluctuation of the chromatic aberration can be reduced when the shape of the interface of the liquid lens 1 is changed.

Second Embodiment

Figure 7:
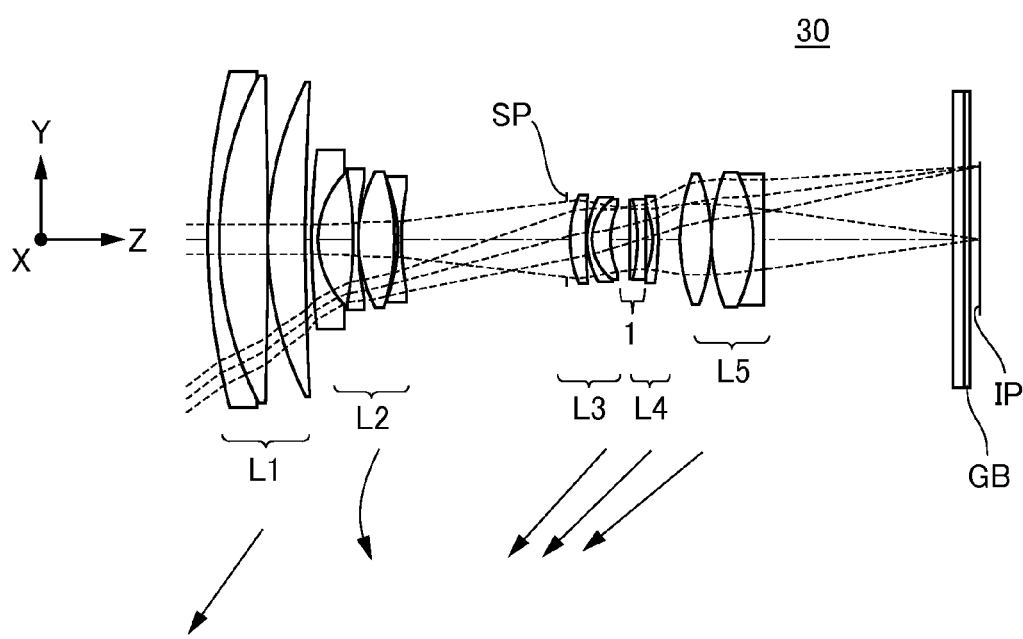
FIG. 7 is a cross-sectional view of the optical system according to a second embodiment of the present invention.
Figure 8A:
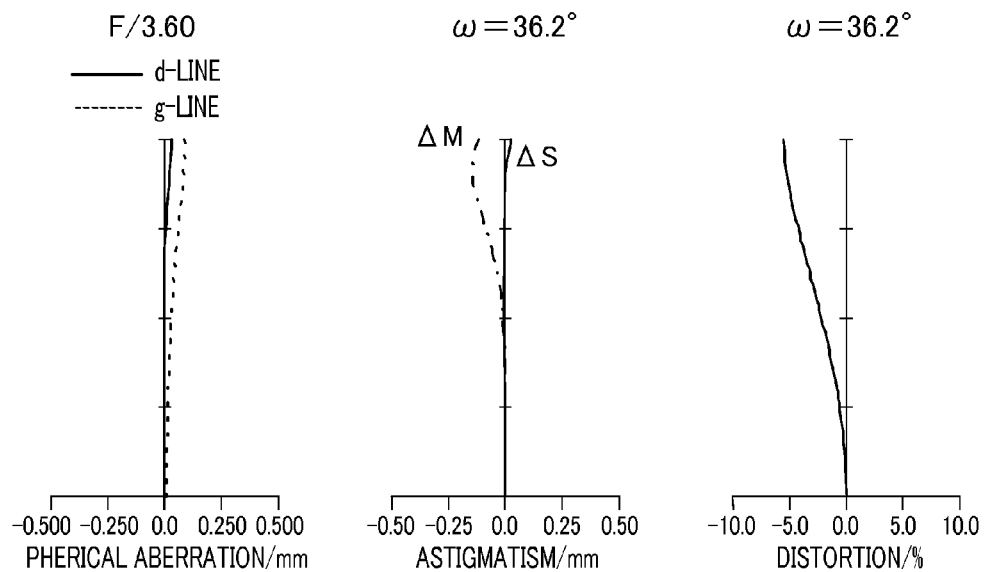
FIG. 8A shows the longitudinal aberration diagrams at the wide-angle end of the optical system according to the second embodiment.
Figure 8B:
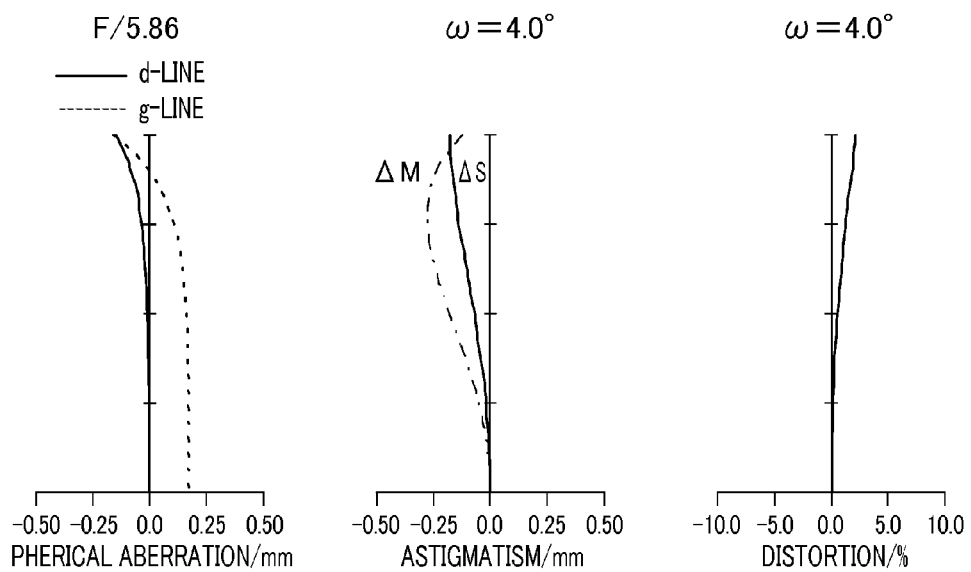
FIG. 8B shows the longitudinal aberration diagrams at the telephoto end of the optical system according to the second embodiment.

Next, an optical system according to a second embodiment of the present invention will be explained. FIG. 7 is a cross-sectional view of the optical system 30 according to the present embodiment. The optical system 30 uses the liquid lens 1 shown in the first embodiment, while the configuration of the lens groups of the optical system 20 of the first embodiment has been changed. First, the optical system 30 is provided with, in order from the light incident side, first lens group L1 having a positive refractive power, a second lens group L2 having a negative refractive power, a third lens group L3 having a positive refractive power, a fourth lens group L4 having a negative refractive power, and a fifth lens group L5 having a positive refractive power. In particular, the optical system 30 of the present embodiment includes the liquid lens 1 in the fourth lens group L4, and similar to the first embodiment, when magnification is changed from the wide angle end to the telephoto end, the first through fifth lens groups L1 to L5 all attain a high magnification by moving in the optical axis direction. In this case, during photography or when the distance to the object changes, the focus is adjusted by the liquid lens 1 included in the fourth lens group L4 changing the shape of the interface 3 therein. Note that in the present embodiment, as a medium used in the liquid lens 1, similar to the first embodiment, an electrolytic solution consisting mainly of water ($n_d$=1.33, $v_d$=55.77) is used in the first medium A, and an oil-based medium having $n_d$=1.49 and $v_d$=53.5 is used in the second medium B. Below, each of the conditions described above is applied to the liquid lens 1 and the optical system 30, and the effects of the present embodiment are shown by substituting specific numerical values. The following TABLE 6 to TABLE 10 correspond to TABLE 1 to TABLE 5, each of which shows the first embodiment. Note that the zoom ratio in TABLE 8 is 10.39. Furthermore, similar to the first embodiment, the longitudinal aberration diagrams (spherical aberration, astigmatism, and distortion) according to the present embodiment are shown in FIG. 8A and FIG. 8B. In particular, FIG. 8A is the longitudinal aberration diagrams at the wide angle end, and FIG. 8B is the longitudinal aberration diagrams at the telephoto end. In this manner, the fluctuation of the chromatic aberration can also be reduced by the optical system 30 of the present embodiment when the shape of the interface of the liquid lens 1 is changed.

TABLE 6

| No. | R (mm) | d (mm) | $n_d$ | $v_d$ | Effective radius (mm) |
|---|---|---|---|---|---|
| 1 | 114.814 | 2.00 | 1.80610 | 33.3 | 59.44 |
| 2 | 62.313 | 8.82 | 1.49700 | 81.5 | 57.46 |
| 3 | −2219.848 | 0.15 | | | 57.03 |
| 4 | 63.370 | 6.80 | 1.48749 | 70.2 | 54.78 |
| 5 | 530.540 | (variable) | | | 54.18 |
| 6 | 121.634 | 1.20 | 1.83481 | 42.7 | 29.61 |
| 7 | 16.916 | 6.19 | | | 23.42 |
| 8 | −67.998 | 0.90 | 1.77250 | 49.6 | 23.04 |
| 9 | 49.889 | 0.15 | | | 22.25 |
| 10 | 26.126 | 6.54 | 1.80518 | 25.4 | 22.13 |
| 11 | −35.676 | 0.42 | | | 20.99 |
| 12 | −30.835 | 0.85 | 1.77250 | 49.6 | 20.45 |
| 13 | 52.065 | (variable) | | | 19.00 |
| 14 (stop) | ∞ | 0.52 | | | 13.52 |
| 15 | 19.356 | 3.04 | 1.69680 | 55.5 | 14.06 |
| 16* | 319.013 | 0.15 | | | 13.83 |
| 17 | 14.934 | 0.90 | 1.80518 | 25.4 | 13.52 |
| 18 | 8.827 | 3.24 | 1.60342 | 38.0 | 12.53 |
| 19 | 14.044 | (variable) | | | 11.89 |
| 20 | ∞ | 1.36 | 1.33304 | 55.7 | 12.12 |
| 21 | −28.188 | 1.33 (focus variable) | 1.48961 | 53.5 | 12.23 |
| 22 | ∞ | 1.30 | | | 12.50 |
| 23 | −15.678 | 1.10 | 1.83481 | 42.7 | 12.50 |
| 24 | −49.670 | (variable) | | | 13.79 |
| 25 | 30.303 | 5.65 | 1.49700 | 81.5 | 20.41 |
| 26 | −32.352 | 0.10 | | | 21.17 |
| 27 | 33.624 | 7.42 | 1.51633 | 64.1 | 21.90 |
| 28 | −26.534 | 2.00 | 1.69680 | 55.5 | 21.55 |
| 29* | −108.528 | (variable) | | | 21.56 |
| 30 | ∞ | 2.06 | 1.54400 | 60.0 | 50.00 |
| 31 | ∞ | 1.10 | 1.55900 | 58.6 | 50.00 |
| 32 | ∞ | | | | 50.00 |
| Image plane | ∞ | | | | |

TABLE 7

| | k | A | B | C | D | E |
|---|---|---|---|---|---|---|
| 16$^{th}$ plane | 0.0 | −3.71701e−007 | −1.34822e−008 | None | None | None |
| 29$^{th}$ plane | 0.0 | 3.62136e−005 | 3.34108e−008 | −1.35308e−010 | 7.78089e−013 | None |

TABLE 8

| | Wide angle (mm) | Intermediate (mm) | Telephoto (mm) |
|---|---|---|---|
| Focal distance | 18.60 | 50.00 | 193.27 |
| F number | 3.60 | 4.94 | 5.86 |
| Image angle | 36.17 | 15.22 | 4.03 |
| Image height | 13.60 | 13.60 | 13.60 |
| Lens total length | 139.2 | 171.1 | 207.1 |
| BF | 1.78 | 1.78 | 1.78 |
| d (5$^{th}$ plane) | 1.00 | 28.13 | 66.26 |
| d (13$^{th}$ plane) | 29.71 | 14.33 | 2.85 |
| d (19$^{th}$ plane) | 3.58 | 3.18 | 2.29 |
| d (24$^{th}$ plane) | 3.85 | 2.01 | 0.67 |
| d (29$^{th}$ plane) | 33.97 | 56.33 | 67.96 |
| Incident pupil position | 33.41 | 89.14 | 334.44 |
| Emitting pupil position | −88.70 | −96.51 | −99.68 |
| Front side main point position | 48.19 | 113.70 | 159.53 |
| Back side main point position | −16.82 | −48.22 | −191.50 |

TABLE 9

| Lens group | First plane | Focal distance (mm) | Lens configuration length (mm) | Front main point position (mm) | Back main point position (mm) |
|---|---|---|---|---|---|
| L1 | 1 | 111.17 | 17.77 | 4.53 | −7.28 |
| L2 | 6 | −16.24 | 16.25 | 3.35 | −7.31 |
| L3 | 14 | 32.07 | 7.86 | −3.95 | −7.72 |
| L4 | 20 | −23.90 | 5.10 | 2.67 | −1.14 |
| L5 | 25 | 22.42 | 15.17 | 2.72 | −7.48 |
| GB | 30 | ∞ | 3.16 | 1.02 | −1.02 |

TABLE 10

| Lens | First plane | Focal distance (mm) |
|---|---|---|
| 1 | 1 | −171.97 |
| 2 | 2 | 122.11 |
| 3 | 4 | 146.92 |
| 4 | 6 | −23.66 |
| 5 | 8 | −37.13 |
| 6 | 10 | 19.66 |
| 7 | 12 | −24.96 |
| 8 | 15 | 29.45 |
| 9 | 17 | −28.70 |
| 10 | 18 | 31.91 |
| 11 | 20 | 84.64 |
| 12 | 21 | −57.57 |
| 13 | 23 | −27.85 |
| 14 | 25 | 32.45 |
| 15 | 27 | 29.98 |
| 16 | 28 | −50.91 |
| 17 | 30 | 0.00 |
| 18 | 31 | 0.00 |

Third Embodiment

Figure 9:
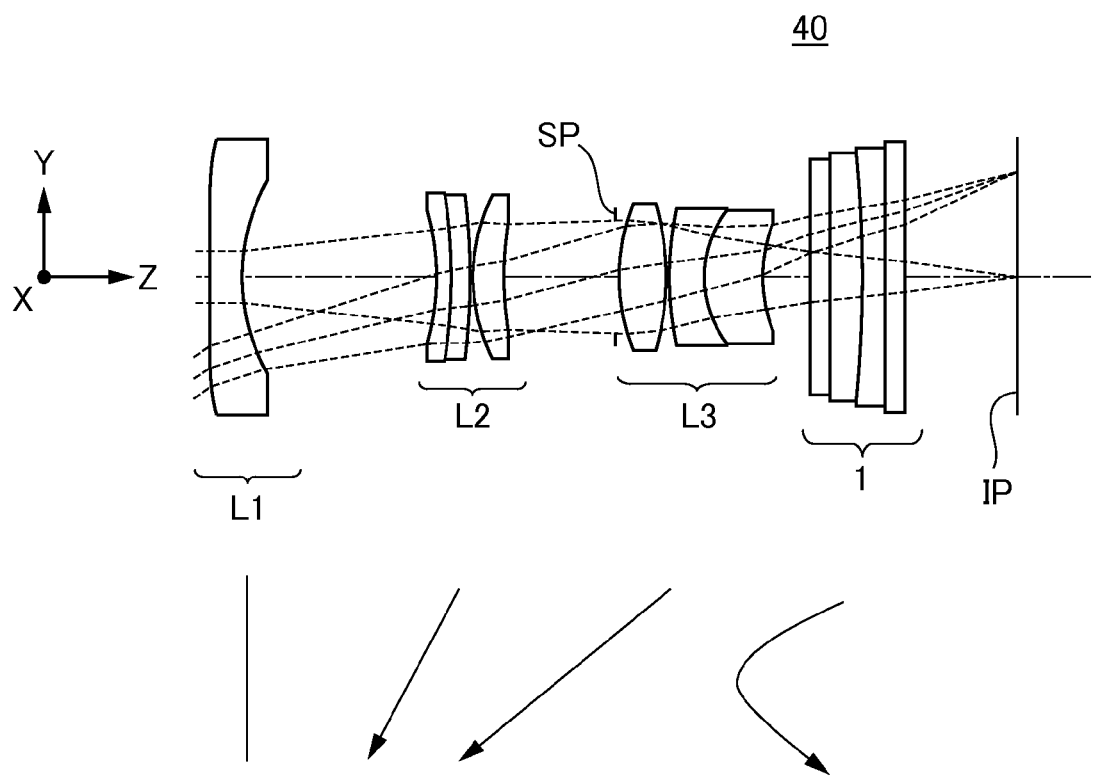
FIG. 9 is a cross-sectional view of the optical system according to a third embodiment of the present invention.
Figure 10A:
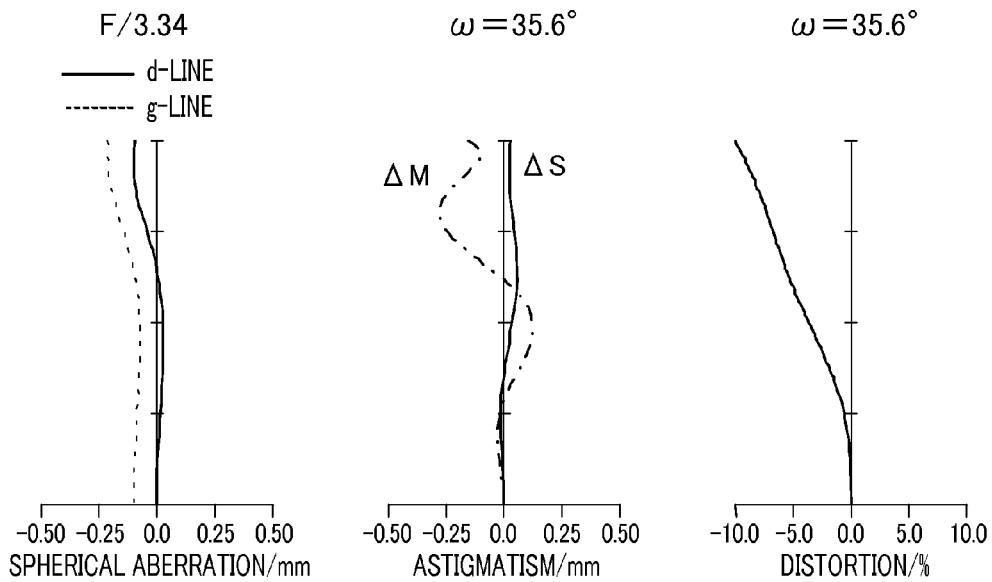
FIG. 10A shows the longitudinal aberration diagrams at the wide angle end of the optical system according to the third embodiment.
Figure 10B:
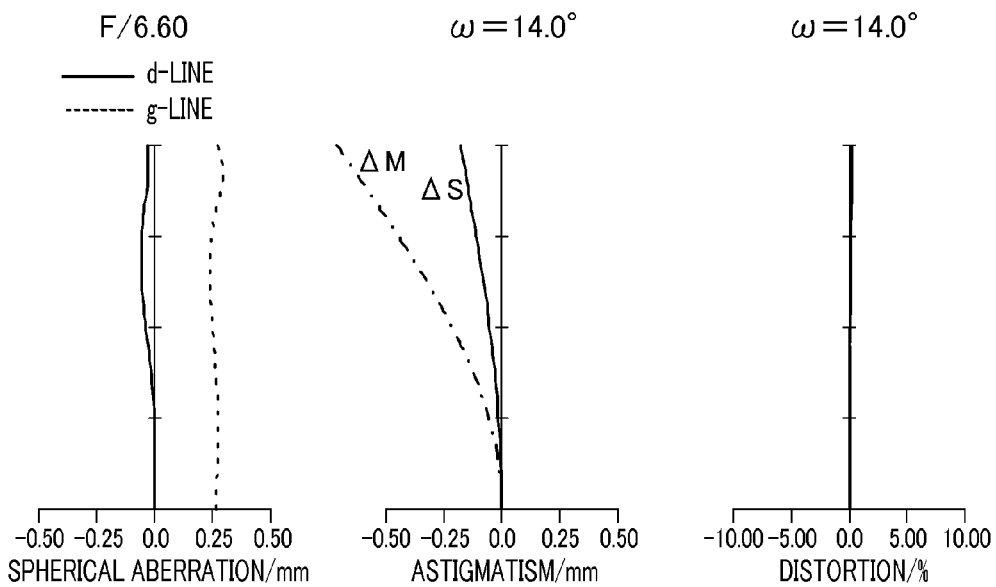
FIG. 10B shows the longitudinal aberration diagrams at the telephoto end of the optical system according to the third embodiment.

Next, an optical system according to a third embodiment of the present invention will be explained. FIG. 9 is a cross-sectional view of an optical system 40 according to the present embodiment. This optical system 40 also uses the liquid lens 1 shown in the first embodiment, and the configuration of the lens groups of the optical system of each of the embodiments described above is changed. First, the optical system 40 is provided with, in order from the light incident side, a first lens group L1 having a negative refractive power, a second lens group L2 having a positive refractive power, and a third lens group L3 having a positive refractive power. Furthermore, in the optical system 40 of the present embodiment, the liquid lens 1 is arranged in the area of the image plane side with respect to the third lend group L3, and similar to the first embodiment, when magnification is changed from the wide angle end to the telephoto end, first through third lens groups L1 to L3 all attain a high magnification by moving in the direction of the optical axis. In this case as well, while photographing or when the distance to the object changes, the focus is adjusted by the liquid lens 1 changing the shape of the interface 3 therein. Note that in the present embodiment, as a media used in the liquid lens 1, similar to the first embodiment, an electrolytic solution consisting mainly of water ($n_d$=1.33, $v_d$=55.7) is used in the first medium A, and an oil-based medium having $n_d$=1.50 and $v_d$=50.5 is used in the second medium B. Below, each of the conditions explained above is applied to the liquid lens 1 and the optical system 40, and effects of the present embodiment are shown by substituting specific numerical values. TABLE 11 to TABLE 15 below correspond to TABLE 1 to TABLE 5, each of which shows the first embodiment. Note that the zoom ratio in TABLE 13 is 2.87. Furthermore, similar to the first embodiment, FIG. 10A and FIG. 10B show longitudinal aberration diagrams (spherical aberration, astigmatism, and distortion) according to the present embodiment. In particular, FIG. 10A shows the longitudinal aberration diagrams at the wide angle end and FIG. 10B shows the longitudinal aberration diagrams at the telephoto end. In this manner, the fluctuation of the chromatic aberration can also be reduced when changing the shape of the interface of the liquid lens 1 by using the optical system 40 of the present embodiment.

TABLE 11

| No. | R (mm) | d (mm) | $n_d$ | $v_d$ | Effective radius (mm) |
|---|---|---|---|---|---|
| 1* | 100.000 | 0.80 | 1.80440 | 39.6 | 6.00 |
| 2* | 4.921 | (variable) | | | 5.05 |
| 3 | −6.302 | 0.40 | 1.48749 | 70.2 | 3.50 |
| 4 | −12.570 | 0.47 | 1.53172 | 48.8 | 3.48 |
| 5 | −18.429 | 0.10 | | | 3.46 |
| 6* | 5.394 | 0.80 | 1.85026 | 32.3 | 3.44 |
| 7* | 14.423 | (variable) | | | 3.08 |
| 8 (stop) | ∞ | 0.10 | | | 2.91 |
| 9* | 4.425 | 1.23 | 1.61405 | 55.0 | 3.05 |
| 10* | −10.523 | 0.10 | | | 2.88 |
| 11* | 7.582 | 0.90 | 1.84666 | 23.8 | 2.79 |
| 12 | 2.836 | 1.51 | 1.48749 | 70.2 | 2.59 |
| 13 | 3.938 | (variable) | | | 2.76 |
| 14 | ∞ | 0.50 | 1.51633 | 64.1 | 4.39 |
| 15 | ∞ | (variable) | 1.33341 | 55.7 | 5.15 |
| 16 | (variable) | (variable) | 1.55000 | 50.5 | 5.40 |
| 17 | ∞ | 0.50 | 1.51633 | 64.1 | 5.65 |
| 18 | ∞ | (variable) | | | 5.96 |
| Image plane | ∞ | | | | |

TABLE 12

| | k | A | B | C | D | E |
|---|---|---|---|---|---|---|
| 1st plane | 0.0 | −3.70364e−003 | 1.01391e−003 | −1.02598e−004 | 3.92905e−006 | None |
| 2nd plane | 0.0 | −6.54025e−003 | 2.39669e−003 | −3.66517e−004 | 2.25078e−005 | None |
| 6th plane | 0.0 | −5.62974e−004 | 9.84198e−004 | 1.53470e−004 | −5.47842e−005 | None |
| 7th plane | 0.0 | 1.25170e−003 | 5.58373e−004 | 5.32302e−004 | −1.36042e−004 | None |
| 9th plane | 0.0 | −7.99882e−004 | −9.67701e−004 | 5.21969e−004 | −1.86052e−004 | None |
| 10th plane | 0.0 | −2.40653e−003 | −8.22681e−004 | −2.64163e−004 | None | None |
| 11th plane | 0.0 | −4.09528e−003 | 7.78225e−005 | −6.87363e−004 | 1.38904e−004 | None |

TABLE 13

|  | Wide angle (mm) | Intermediate (mm) | Telephoto (mm) |
|---|---|---|---|
| Focal distance | 4.90 | 9.83 | 14.06 |
| F number | 3.34 | 5.35 | 6.60 |
| Image angle | 35.6 | 19.6 | 14.0 |
| Image height | 3.50 | 3.50 | 3.50 |
| Lens total length | 21.0 | 21.0 | 21.0 |
| BF | 3.00 | 6.92 | 3.29 |
| d ($2^{nd}$ plane) | 5.07 | 1.75 | 1.25 |
| d ($7^{th}$ plane) | 2.88 | 2.07 | 0.10 |
| d ($13^{th}$ plane) | 1.24 | 1.23 | 7.56 |
| R ($16^{th}$ plane) | −32.16 | −25.71 | −24.07 |
| d ($15^{th}$ plane) | 0.85 | 0.87 | 0.88 |
| d ($16^{th}$ plane) | 0.60 | 0.58 | 0.57 |
| d ($18^{th}$ plane) | 3.00 | 6.92 | 3.29 |
| Incident pupil position | 4.32 | 3.32 | 2.21 |
| Emitting pupil position | −4.65 | −4.62 | −10.19 |
| Front side main point position | 6.08 | 4.85 | 1.64 |
| Back side main point position | −1.90 | −2.80 | −10.73 |

TABLE 14

| Lens group | First plane | Focal distance (mm) | Lens Configuration length (mm) | Front main point position (mm) | Back main point position (mm) |
|---|---|---|---|---|---|
| L1 | 1 | −6.46 | 0.80 | 0.47 | 0.02 |
| L2 | 3 | 17.91 | 1.77 | 1.07 | 0.02 |
| L3 | 8 | 7.73 | 3.85 | −2.28 | −3.59 |
| Liquid lens 1 | 14 | −148.21 | 2.45 | 0.97 | −0.72 |

TABLE 15

| Lens | First plane | Focal distance (mm) |
|---|---|---|
| 1 | 1 | −6.46 |
| 2 | 3 | −26.48 |
| 3 | 4 | −76.47 |
| 4 | 6 | 9.74 |
| 5 | 9 | 5.24 |
| 6 | 11 | −5.86 |
| 7 | 12 | 14.33 |
| 8 | 14 | 0.00 |
| 9 | 15 | 96.55 |
| 10 | 16 | −58.47 |
| 11 | 17 | 0.00 |

Fourth Embodiment

Figure 1B:
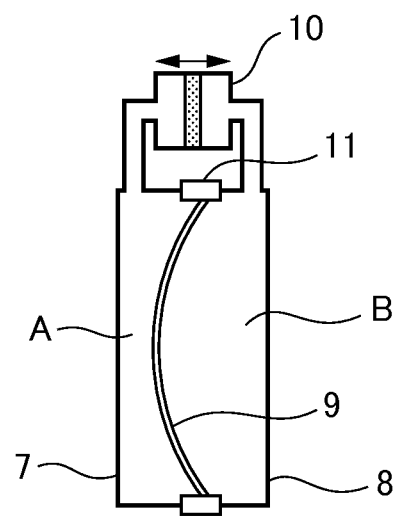
FIG. 1B is a schematic drawing that shows another example configuration of the variable focus lens according to the first embodiment of the present invention.
Figure 11:
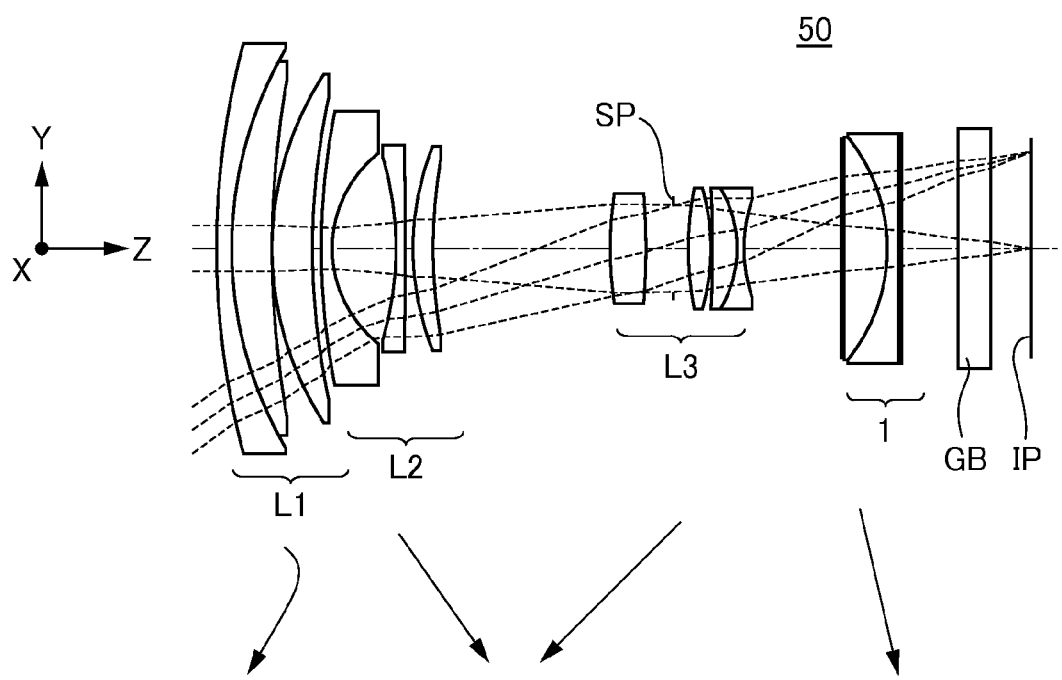
FIG. 11 is a cross-sectional view of the optical system according to a fourth embodiment of the present invention.
Figure 12A:
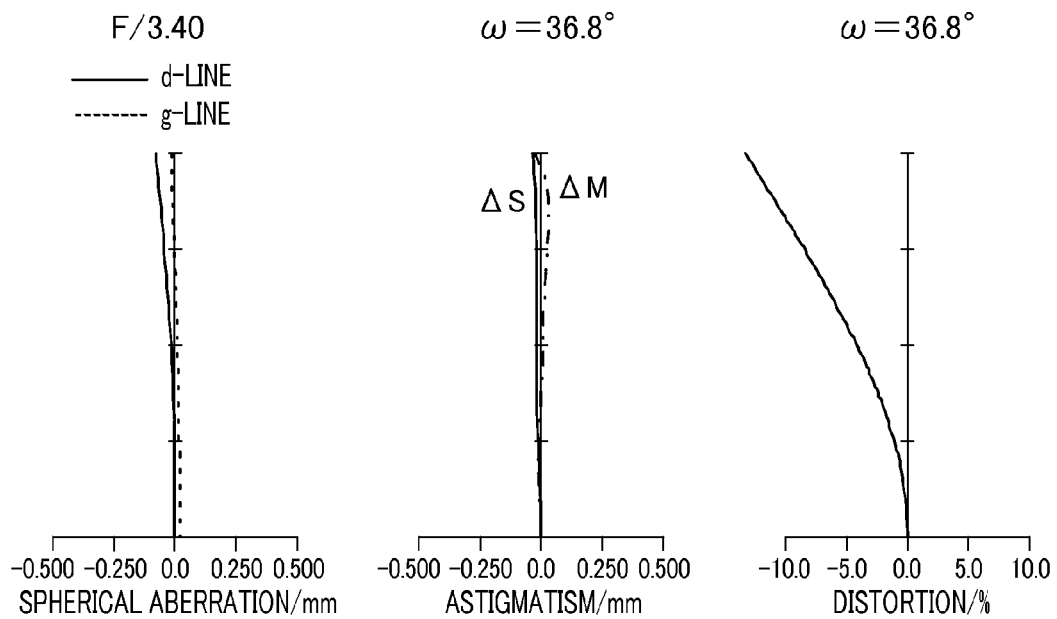
FIG. 12A shows the longitudinal aberration diagrams at the wide-angle end of the optical system according to the fourth embodiment.
Figure 12B:
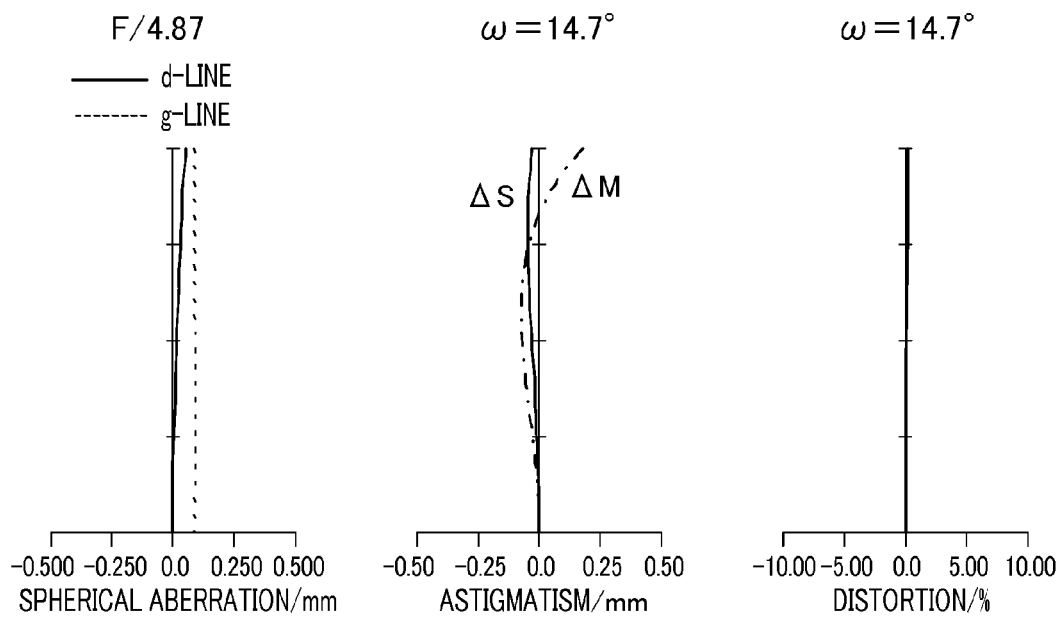
FIG. 12B shows the longitudinal aberration diagrams at the telephoto end of the optical system according to the fourth embodiment.

Next, an optical system according to a fourth embodiment of the present invention will be explained. FIG. 11 is a cross-sectional view of the optical system 50 according to the present embodiment. In this optical system 50, the disposition of each of the lens groups is identical to that of the third embodiment, but the performance of the lenses that form each of the lens groups differs. In this case, while photographing or when the distance to the object changes, the focus is adjusted by the liquid lens 1 changing the shape of the inner interface 3 therein. Note that in the present embodiment, as media used in the liquid lens 1, an oil-based medium having $n_d$=1.80 and $v_d$=30.0 is used in the first medium A and an oil-based medium having $n_d$=1.64 and $v_d$=21.2 is used in the second medium B. In this case, in the liquid lens 1, the interface 3, as shown in FIG. 1B, must be formed by an elastic film. Below, each of the above conditions is applied to the liquid lens 1 and the optical system 50, and the effects of the present embodiment are shown by substituting specific numerical values. TABLE 16 to TABLE 20 below respectively correspond to TABLE 1 to TABLE 5, which are shown in the first embodiment. Note that the zoom ratio in TABLE 18 is 2.85. Furthermore, similar to the first embodiment, the longitudinal aberration diagrams (spherical aberration, astigmatism, and distortion) according to the present embodiment are shown in FIG. 12A and FIG. 12B. In particular, FIG. 12A shows longitudinal aberration diagrams at the wide angle end and FIG. 12B shows longitudinal aberration diagrams at the telephoto end. In this manner, when the shape of the interface of the liquid lens 1 is changed, the fluctuation of the chromatic aberration can also be reduced by the optical system 50 of the present embodiment.

TABLE 16

| No. | R (mm) | d (mm) | $n_d$ | $v_d$ | Effective radius (mm) |
|---|---|---|---|---|---|
| 1 | 71.272 | 1.50 | 1.84666 | 23.8 | 35.00 |
| 2 | 35.595 | 3.54 | 1.72000 | 50.2 | 31.89 |
| 3 | 78.973 | 0.15 | | | 30.87 |
| 4 | 28.857 | 3.81 | 1.77250 | 49.6 | 29.59 |
| 5 | 72.142 | (variable) | | | 28.63 |
| 6 | 61.126 | 1.00 | 1.88300 | 40.8 | 23.14 |
| 7* | 11.165 | 5.87 | | | 17.66 |
| 8 | −32.468 | 1.00 | 1.80400 | 46.6 | 17.25 |
| 9 | −316.172 | 0.67 | | | 16.91 |
| 10 | 24.704 | 1.87 | 1.94595 | 18.0 | 17.02 |
| 11 | 57.793 | (variable) | | | 16.60 |
| 12* | 26.832 | 3.19 | 1.74320 | 49.3 | 8.84 |
| 13 | −213.931 | 2.69 | | | 8.45 |
| 14 (stop) | ∞ | 1.40 | | | 7.91 |
| 15 | 34.691 | 1.97 | 1.74400 | 44.8 | 9.39 |
| 16 | −22.881 | 0.14 | | | 9.69 |
| 17* | 311.470 | 2.38 | 1.86400 | 40.6 | 9.69 |
| 18 | −10.438 | 0.58 | 1.72825 | 28.5 | 9.75 |
| 19 | 14.274 | (variable) | | | 9.54 |
| 20 | ∞ | 0.25 | 1.51633 | 64.1 | 18.10 |
| 21 | ∞ | 4.00 | 1.80000 | 30.0 | 18.17 |
| 22 | (variable) | 1.00 | 1.64000 | 21.2 | 18.65 |
| 23 | ∞ | 0.25 | 1.51633 | 64.1 | 19.09 |
| 24 | ∞ | (variable) | | | 19.13 |
| 25 | ∞ | 3.00 | 1.51633 | 64.1 | 46.62 |
| 26 | ∞ | (variable) | | | 60.39 |
| Image plane | ∞ | | | | |

TABLE 17

|  | k | A | B | C | D | E |
|---|---|---|---|---|---|---|
| $7^{th}$ plane | −5.20763e−002 | 2.60450e−006 | 1.94685e−007 | −2.50232e−009 | 3.01471e−011 | None |
| $12^{th}$ plane | 9.42641e+000 | −1.13751e−004 | −4.81907e−007 | −1.23152e−008 | None | None |
| $17^{th}$ plane | −4.70388e+002 | −7.17408e−005 | −2.97190e−007 | 2.21332e−009 | None | None |

TABLE 18

|  | Wide angle (mm) | Intermediate (mm) | Telephoto (mm) |
| --- | --- | --- | --- |
| Focal distance | 14.39 | 19.63 | 41.0 |
| F number | 3.40 | 3.98 | 4.87 |
| Image angle | 36.8 | 28.7 | 14.7 |
| Image height | 10.75 | 10.75 | 10.75 |
| Lens total length | 75.4 | 74.8 | 85.0 |
| BF | 3.85 | 3.85 | 3.85 |
| d ($5^{th}$ plane) | 0.71 | 2.24 | 15.78 |
| d ($11^{th}$ plane) | 16.30 | 10.14 | 1.20 |
| d ($19^{th}$ plane) | 9.04 | 15.46 | 22.90 |
| R ($22^{nd}$ plane) | −15.91 | −19.43 | −33.36 |
| d ($24^{th}$ plane) | 5.22 | 2.85 | 1.00 |
| Incident pupil position | 22.56 | 23.78 | 53.29 |
| Emitting pupil position | −26.06 | −32.05 | −37.66 |
| Front side main point position | 30.03 | 32.68 | 53.80 |
| Back side main point position | −10.53 | −15.77 | −37.14 |

TABLE 19

| Lens group | First plane | Focal distance (mm) | Lens configuration length (mm) | Front main point position (mm) | Back main point position (mm) |
| --- | --- | --- | --- | --- | --- |
| L1 | 1 | 63.69 | 9.00 | −0.14 | −5.20 |
| L2 | 6 | −16.05 | 10.41 | 0.38 | −8.37 |
| L3 | 12 | 19.22 | 12.35 | 1.38 | −7.07 |
| liquid lens 1 | 20 | 99.46 | 5.50 | 2.39 | −0.77 |
| GB | 25 | ∞ | 3.00 | 0.99 | −0.99 |

TABLE 20

| Lens | First plane | Focal distance (mm) |
| --- | --- | --- |
| 1 | 1 | −85.64 |
| 2 | 2 | 87.03 |
| 3 | 4 | 59.96 |
| 4 | 6 | −15.62 |
| 5 | 8 | −45.08 |
| 6 | 10 | 44.39 |
| 7 | 12 | 32.26 |
| 8 | 15 | 18.81 |
| 9 | 17 | 11.73 |
| 10 | 18 | −8.20 |
| 11 | 20 | 0.00 |
| 12 | 21 | 19.89 |
| 13 | 22 | −24.87 |
| 14 | 23 | 0.00 |
| 15 | 25 | 0.00 |

Note that as a reference, for the optical systems of each of the embodiments described above, the values of the case in which each of the conditions is applied to Formula (6) and Formula (10) are shown in the following TABLE 21. As shown in this TABLE 21, in all of the embodiments described above, the conditions of Formula (6) and Formula (10) are satisfied.

TABLE 21

|  | Formula (6) | Formula (10) |
| --- | --- | --- |
| First embodiment | −0.019 | 0.90 |
| Second embodiment | −0.020 | 3.00 |
| Third embodiment | −0.023 | 1.00 |
| Fourth embodiment | 0.022 | 1.00 |

Above, the liquid lens applied to each of the embodiments described above is assumed to have one interface that is formed by two media. However, the present invention is not limited thereby. For example, one liquid lens may have two interfaces formed by three media, or specifically, the liquid lens may have at least one interface.

In addition, in the optical system of each of the embodiments described above, a configuration has one liquid lens. However, the present invention is not limited thereby. Provided that each of the conditions described above is satisfied, a configuration having a plurality of liquid lenses may be used.

Furthermore, in the optical system of each of the embodiments described above, a configuration having three or more lens groups is used. However, the present invention is not limited thereby. The optical system may have at least two or more lens groups.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-259887 filed Nov. 22, 2010 which is hereby incorporated by reference herein it its entirety.

What is claimed is:

1. An optical system comprising a plurality of lens groups and a variable focus lens that can change the refractive power by changing the shape of the interface that is formed by a first medium and a second medium that have differing refractive indices, wherein, the variable focus lens satisfies the following condition:

$$-0.023 \leq \{(n_A-1)/v_A - (n_B-1)/v_B\}/(n_B-n_A) \leq 0.023$$

where $n_A$ and $n_B$ respectively denote the d-line refractive indices of the first and second media, and $v_A$ and $v_B$ respectively denote the d-line Abbe numbers of the first and second media;

the plurality of lens groups moves in an optical axial direction when changing the magnification from the wide angle end to the telephoto end; and the following condition holds:

$$0.8 < |f_{ao}|/f_w < 5$$

where $f_{ao}$ denotes the composite focal distance at the wide angle end of the part of the optical system from the optical surface of the optical system closest to the object side to the optical surface of the variable focus lens closest to the image side, and $f_w$ denotes the focal distance of the entire system at the wide angle end.

2. The optical system according to claim 1, wherein the variable focus lens satisfies the following conditions:

$$n_d < -0.0211 v_d + 2.641$$

$$28 < v_d < 55$$

$$1.48 < n_d$$

where, among the first and second media, $n_d$ and $v_d$ respectively denote the d-line refractive index and Abbe number of the media having the higher refractive index.

* * * * *